United States Patent [19]
Vassiliadis et al.

[11] Patent Number: 5,187,679
[45] Date of Patent: Feb. 16, 1993

[54] GENERALIZED 7/3 COUNTERS

[75] Inventors: Stamatis Vassiliadis, Vestal, N.Y.; Eric M. Schwarz, Stanford, Calif.

[73] Assignee: International Business Machines Corporation, Armonk, N.Y.

[21] Appl. No.: 711,182

[22] Filed: Jun. 5, 1991

[51] Int. Cl.$^5$ .................................................. G06F 7/50
[52] U.S. Cl. .................................. 364/786; 364/215.09
[58] Field of Search ............... 364/136, 784, 715.09

[56] References Cited

U.S. PATENT DOCUMENTS

| | | | |
|---|---|---|---|
| 3,603,776 | 9/1971 | Weinberger | 364/715.09 |
| 3,636,334 | 1/1972 | Svoboda | 364/786 |
| 3,723,715 | 3/1973 | Chen et al. | 364/715.09 |
| 3,741,475 | 6/1973 | Hardy et al. | 364/786 |
| 3,757,098 | 9/1973 | Wright | 364/786 |
| 4,168,530 | 9/1979 | Gajski | 364/760 |
| 4,399,517 | 8/1983 | Niehaus | 364/715.09 |
| 4,488,253 | 12/1984 | Lerough | 364/786 |
| 4,589,019 | 5/1986 | Dischert | 358/160 |
| 4,594,679 | 6/1986 | George | 364/754 |
| 4,604,723 | 8/1986 | Burrows | 364/786 |
| 4,607,176 | 8/1986 | Burrows et al. | 364/715.09 |
| 4,706,210 | 11/1987 | Snelling | 364/758 |
| 4,796,219 | 1/1989 | Williams | 364/758 |
| 4,918,639 | 4/1990 | Schwartz | 364/754 |
| 5,095,457 | 3/1992 | Jeong | 364/715.09 |

OTHER PUBLICATIONS

Crosthwait et al, "Column Toter PLA" *IBM Tech. Disclosure Bulletin*, vol. 22, No. 6, Nov. 1979, pp. 2339-2341.
IEEE Transactions on Computers, vol. C-22, No. 12, Dec., 1973, Charles Baugh, "A Two's Complement Parallel Array Multiplication Algorithm", pp. 1045-1047.
IEEE Transactions on Computers, Apr., 1971, S. D. Pezaris, "A 40-ns 17-Bit by 17-Bit Array Multiplier", pp. 442-447.
IEEE Transaction on Electronic Computers, Feb., 1964, C. S. Wallace, "A Suggestion for a Fast Multiplier", pp. 14-17.
IEEE Transactions on Computers, vol. C-29, No. 10, Oct., 1980, "Composite Parallel Counters", by L. Dadda, pp. 942-946.
"Some Schemes for Parallel Multipliers", by L. Dadda, vol. XXXIV, N-5, Maggio, 1965, pp. 349-356.
K. Hwang, "Computer Arithmetic: Principles, Architecture, and Design", New York, Wiley, 1979, pp. 172-178.
E. M. Schwarz, "Parallel Processing and VLSI Design: Solving Large Scale Linear Systems", Ohio University, Master's Thesis, Ch. 5, Nov. 1984.
IEEE Transactions on Computers, vol. C-26, Oct., 1977, pp. 56-66.
"A Compact Hight-Speed Parallel Multiplication Scheme", Stenzel, et al. pp. 948-957.
IBM Technical Disclosure Bulletin, vol. 30, No. 3, Aug., 1987, "Multiply-Addition—An Ultra High Performance Dataflow", pp. 982-987.

*Primary Examiner*—David H. Malzahn
*Attorney, Agent, or Firm*—Baker, Maxham, Jester & Meador

[57] ABSTRACT

A generalized 7/3 counter is proposed that may have all, some, or none of the input elements negative. The generalized counter can be used in array multipliers and in general for the reduction of matrices which have rows that must be added and need the advantage of a carry-free addition for speed purposes.

9 Claims, 9 Drawing Sheets

FIG. 1A

| X0 | X1 | X2 | X3 | X4 | X5 | X6 | SUM |
|----|----|----|----|----|----|----|-----|
| +  | +  | +  | +  | +  | +  | +  | s   |
|    |    |    |    |    | c2 | c1 |     | combination A
range 0 to +7
Type 0

FIG. 1B

| X0 | X1 | X2 | X3 | X4 | X5 | X6 | SUM |
|----|----|----|----|----|----|----|-----|
| +  | +  | +  | +  | +  | +  | −  | (s) |
|    |    |    |    |    | c2 | c1 |     | combination B
range −1 to +6
Type 1

FIG. 1C

| X0 | X1 | X2 | X3 | X4 | X5 | X6 | SUM |
|----|----|----|----|----|----|----|-----|
| +  | +  | +  | +  | +  | −  | −  | s   |
|    |    |    |    |    | c2 | (c1) |   | combination C
range −2 to +5
Type 2

FIG. 1D

| X0 | X1 | X2 | X3 | X4 | X5 | X6 | SUM |
|----|----|----|----|----|----|----|-----|
| +  | +  | +  | +  | −  | −  | −  | (s) |
|    |    |    |    |    | c2 | (c1) |   | combination D
range −3 to +4
Type 3

FIG. 1E

| X0 | X1 | X2 | X3 | X4 | X5 | X6 | SUM |
|----|----|----|----|----|----|----|-----|
| +  | +  | +  | −  | −  | −  | −  | s   |
|    |    |    |    |    | (c2) | c1 | | combination E
range −4 to +3
Type 3

FIG. 1F

| X0 | X1 | X2 | X3 | X4 | X5 | X6 | SUM |
|----|----|----|----|----|----|----|-----|
| +  | +  | −  | −  | −  | −  | −  | (s) |
|    |    |    |    |    | (c2) | c1 | | combination F
range −5 to +2
Type 2

FIG. 1G

| X0 | X1 | X2 | X3 | X4 | X5 | X6 | SUM |
|----|----|----|----|----|----|----|-----|
| +  | −  | −  | −  | −  | −  | −  | s   |
|    |    |    |    |    | (c2) | (c1) | | combination G
range −6 to +1
Type 1

FIG. 1H

| X0 | X1 | X2 | X3 | X4 | X5 | X6 | SUM |
|----|----|----|----|----|----|----|-----|
| −  | −  | −  | −  | −  | −  | −  | (s) |
|    |    |    |    |    | (c2) | (c1) | | combination H
range −7 to +0
Type 0

| SUM | c2 + | c1 + | s + |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 | combination A
range 0 to +7
Type 0

FIG. 2A

| SUM | c2 + | c1 + | s − |
|---|---|---|---|
| −1 | 0 | 0 | 1 |
| 0 | 0 | 0 | 0 |
| 1 | 0 | 1 | 1 |
| 2 | 0 | 1 | 0 |
| 3 | 1 | 0 | 1 |
| 4 | 1 | 0 | 0 |
| 5 | 1 | 1 | 1 |
| 6 | 1 | 1 | 0 | combination B
range −1 to +6
Type 1

FIG. 2B

| SUM | c2 + | c1 − | s + |
|---|---|---|---|
| −2 | 0 | 1 | 0 |
| −1 | 0 | 1 | 1 |
| 0 | 0 | 0 | 0 |
| 1 | 0 | 0 | 1 |
| 2 | 1 | 1 | 0 |
| 3 | 1 | 1 | 1 |
| 4 | 1 | 0 | 0 |
| 5 | 1 | 0 | 1 | combination C
range −2 to +5
Type 2

FIG. 2C

| SUM | c2 + | c1 − | s − |
|---|---|---|---|
| −3 | 0 | 1 | 1 |
| −2 | 0 | 1 | 0 |
| −1 | 0 | 0 | 1 |
| 0 | 0 | 0 | 0 |
| 1 | 1 | 1 | 1 |
| 2 | 1 | 1 | 0 |
| 3 | 1 | 0 | 1 |
| 4 | 1 | 0 | 0 | combination D
range −3 to +4
Type 3

FIG. 2D

| SUM | c2 − | c1 + | s + |
|---|---|---|---|
| −4 | 1 | 0 | 0 |
| −3 | 1 | 0 | 1 |
| −2 | 1 | 1 | 0 |
| −1 | 1 | 1 | 1 |
| 0 | 0 | 0 | 0 |
| 1 | 0 | 0 | 1 |
| 2 | 0 | 1 | 0 |
| 3 | 0 | 1 | 1 | combination E
range −4 to +3
Type 3

FIG. 2E

| SUM | c2 − | c1 + | s − |
|---|---|---|---|
| −5 | 1 | 0 | 1 |
| −4 | 1 | 0 | 0 |
| −3 | 1 | 1 | 1 |
| −2 | 1 | 1 | 0 |
| −1 | 0 | 0 | 1 |
| 0 | 0 | 0 | 0 |
| 1 | 0 | 1 | 1 |
| 2 | 0 | 1 | 0 | combination F
range −5 to +2
Type 2

FIG. 2F

| SUM | c2 − | c1 − | s + |
|---|---|---|---|
| −6 | 1 | 1 | 0 |
| −5 | 1 | 1 | 1 |
| −4 | 1 | 0 | 0 |
| −3 | 1 | 0 | 1 |
| −2 | 0 | 1 | 0 |
| −1 | 0 | 1 | 1 |
| 0 | 0 | 0 | 0 |
| 1 | 0 | 0 | 1 | combination G
range −6 to +1
Type 1

FIG. 2G

| SUM | c2 − | c1 − | s − |
|---|---|---|---|
| −7 | 1 | 1 | 1 |
| −6 | 1 | 1 | 0 |
| −5 | 1 | 0 | 1 |
| −4 | 1 | 0 | 0 |
| −3 | 0 | 1 | 1 |
| −2 | 0 | 1 | 0 |
| −1 | 0 | 0 | 1 |
| 0 | 0 | 0 | 0 | combination H
range −7 to +0
Type 0

FIG. 2H

Type 0 x0　x1　x2　x3　x4　x5　x6　　combination A
OR
(x0) (x1) (x2) (x3) (x4) (x5) (x6)　combination H

PRODUCE:

Type 1 x0　x1　x2　x3　x4　x5　(x6)　combination B
OR
(x0) (x1) (x2) (x3) (x4) (x5)　x6　combination G

PRODUCE:

Type 2

| x0 | x1 | x2 | x3 | x4 | (x5) | (x6) | combination C |
|----|----|----|----|----|------|------|---------------|
| OR |    |    |    |    |      |      |               |
| (x0) | (x1) | (x2) | (x3) | (x4) | x5 | x6 | combination F |

PRODUCE:

Type 3

| x0 | x1 | x3 | x3 | (x4) | (x5) | (x6) | combination D |
|----|----|----|----|------|------|------|---------------|
| OR |    |    |    |      |      |      |               |
| (x0) | (x1) | (x2) | (x3) | x4 | x5 | x6 | combination E |

PRODUCE:

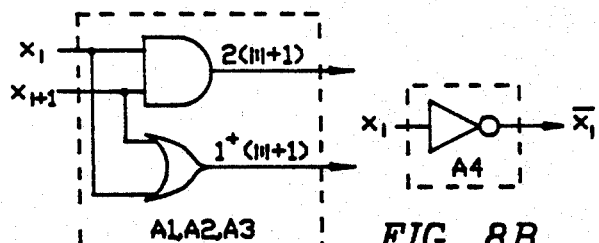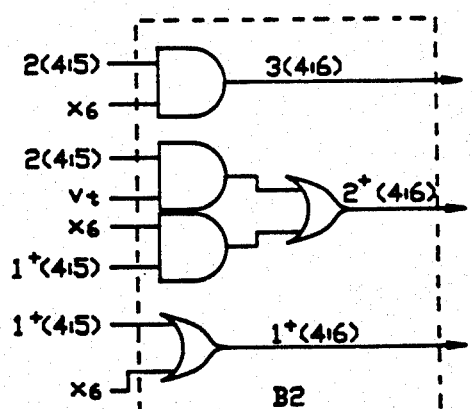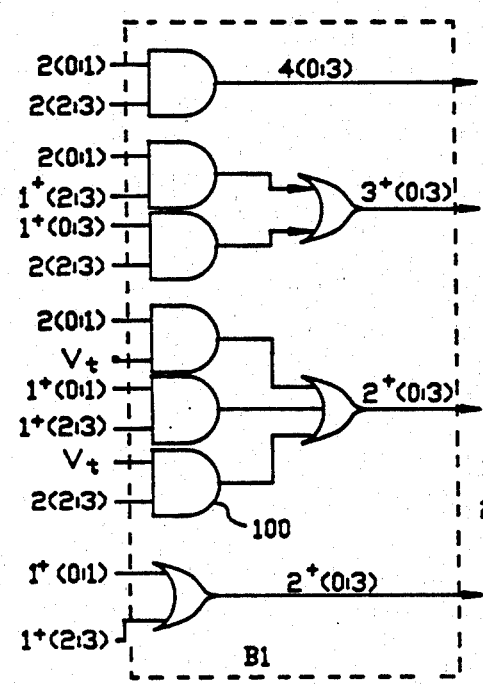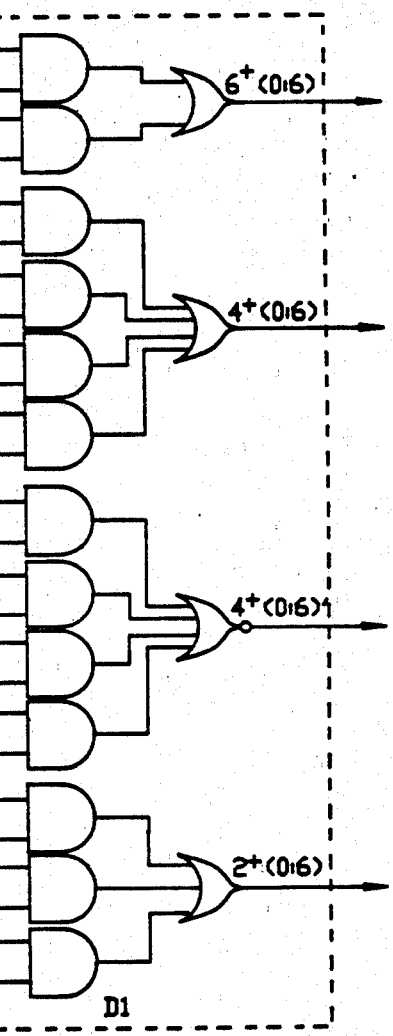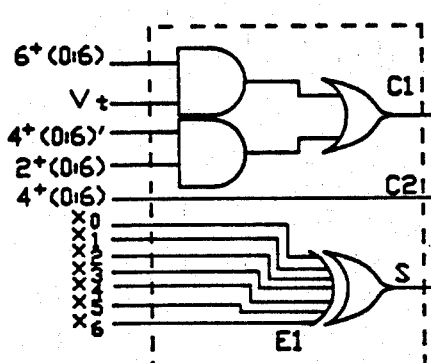
FIG. 8A
FIG. 8B
FIG. 8C
FIG. 8D
FIG. 8E
FIG. 8F

GENERALIZED 7/3 COUNTERS

BACKGROUND OF THE INVENTION

The field of the present invention is digital counters, and more particularly, multiple input parallel counters, and still more particularly, generalized 7/3 counters useful for array multipliers and other matrix operations where rows of numbers are to be added in parallel.

Counters are used in place of 2/1 adders for applications that need to add many operands together. They provide a means of avoiding the carry propagation of a carry lookahead adder(CLA) thus reducing the number of operands to be added in a reduced number of stages. This is because in a 3/2 counter 3 operands are reduced to 2 operands bitwise and they do not require a carry to be propagated the length of the operand. In most applications where many operands must be summed, counters are used to reduce the operands to 2 operands and then a CLA is used to reduce two operands to the final sum. Various applications exist for these counters, for example in multipliers where many partial products must be reduced to the final product. Dadda, *Some Schemes for Parallel Multipliers*, Alta Frequenza, Vol. 34, pp. 349-356 (May 1965), Dadda, *Composite Parallel Counters*, IEEE Trans. Comput., Vol. C-29, pp. 942-946 (Oct. 1965) and Wallace, *A Suggestion For a Fast Multiplier*, IEEE Trans. Electron Comput., Vol. EC-13, pp. 14-17 (Feb. 1964), have suggested optimal layouts for these counters to reduce the number of counter books and stages required for the reduction of partial products in multipliers. In addition, generalized 3/2 counters for two's complement multipliers have been suggested by Pezaris, *A 40-ns 17-Bit Array Multiplier*, IEEE Trans. Comput., Vol. C-20, pp. 442-447 (Apr. 1971).

3/2 counters have been used in many implementations. See George and Hefner, *High Speed Hardware Multipilier For Fixed Floating Point Coerands.* U.S. Pat. No. 4,594,679 (June 10, 1986); Baugh and Wooley, *A Two's Complement Parallel Array Multiplication Algorithm*, IEEE Trans. Comput., Vol. C-22, pp. 1045-1047 (Dec. 1973); and Hwang, *Computer Arithmetic Principles, Architecture, and Design*, pp. 173-176 (1979). 7/3 counters, however, have been avoided due to the complexity associated with their design. The design complexity of the 7/3 counter is principally a result of difficulties presented by the primary carry bit. In this regard, the counter produces 3 output bits: the sum bit, the least significant which by placement is multiplied by $2^0$, the primary carry bit, the middle in significance which by placement has an implied multiplication by $2^1$, and the secondary carry bit, the most significant and has implied multiplication of $2^2$. The sum bit is equal to one if the sum of the input elements is odd which can easily be implemented by a 7 way exclusive-O-Ring (XOR). The secondary carry bit is equal to one if the sum of the elements is equal to 4 or more; to implement this in one stage would require 4×35 AND-OR (AO) gate. Two stages would require 35 4-way NAND gates, wire-ANDing capability of 35 inputs, and an inverter. Three stages with wire-ANDing could be done by 5 8-way ANDs and the inversion by a 5 way NAND. The primary carry bit is more difficult to implement than either the sum bit or the secondary carry, it is equal to a one if the sum is equal to 2, 3, 6, or 7. To implement this bit from all the combinations that produce these sums would require a 7×64 AO. With minimization this gate is reduced to a 6×48 AO which can't be implemented very easily especially compared to the 4×35 AO required for the secondary carry bit In addition both the true and complement of the inputs are required and their fanouts would require repowering stages.

A 7/3 counter employing a small, fast architecture would be desirable. Such counters would result in the advantage of fewer stages required for the reductions. For instance in 7 stages, using 3/2 counters and 1 CLA, 19 terms can be reduced to 1; in 7 stages, using 7/3 counters, 1 - 3/2 counter, and 1 CLA, 183 terms can be reduced to 1. In addition, 35 terms can be reduced to 1 in 5 stages, 15 terms can be reduced to 1 in 4 stages and 7 terms can be reduced to 1 in 3 stages, using a 7/3 counter scheme. In general, it can be stated that 7/3 counters inherently require fewer stages to reduce the same number of terms.

SUMMARY OF THE INVENTION

The present invention is directed to an improved 7/3 counter that can be adapted for use in a variety of applications where only 3/2 counters may have been practicable before. To that end, there is proposed a generalized counter, and specifically a generalized 7/3 counter which has as a subset the 7/3 counter. The proposed generalized 7/3 counters are capable of adding eight possible combinations with the implementation of four types of counter circuits. One circuit implements the equations for a 7/3 counter with all positive elements. There is also provided the equations and designs of three circuits for generalized 7/3 counters with 1-3 negative elements. All of the proposed designs may be used in applications that require the summation of many operands, such as in multipliers.

BRIEF DESCRIPTION OF THE DRAWINGS

The objects, features and advantages of the present invention will be more readily appreciated from the detailed description below when read in conjunction with the accompanying drawings, in which:

FIGS. 1A-H are tabular representations of possible summation combinations of seven input digits;

FIGS. 2A-H are tabular representations of possible three digit outputs representing summation combinations of seven input digits;

FIGS. 3A-D are modified tabular representations of possible three digit outputs representing summation combinations of seven input digits with analogous positive and negative combinations shown in a single representation;

FIGS. 8A and 8F are logic diagrams each illustrating design details of a block in a Type 0 7/3 counter illustrated in FIG. 4.

DETAILED DESCRIPTION OF THE PREFERRED EMBODIMENTS

A. Types of 7/3 Counters

Figure 4:
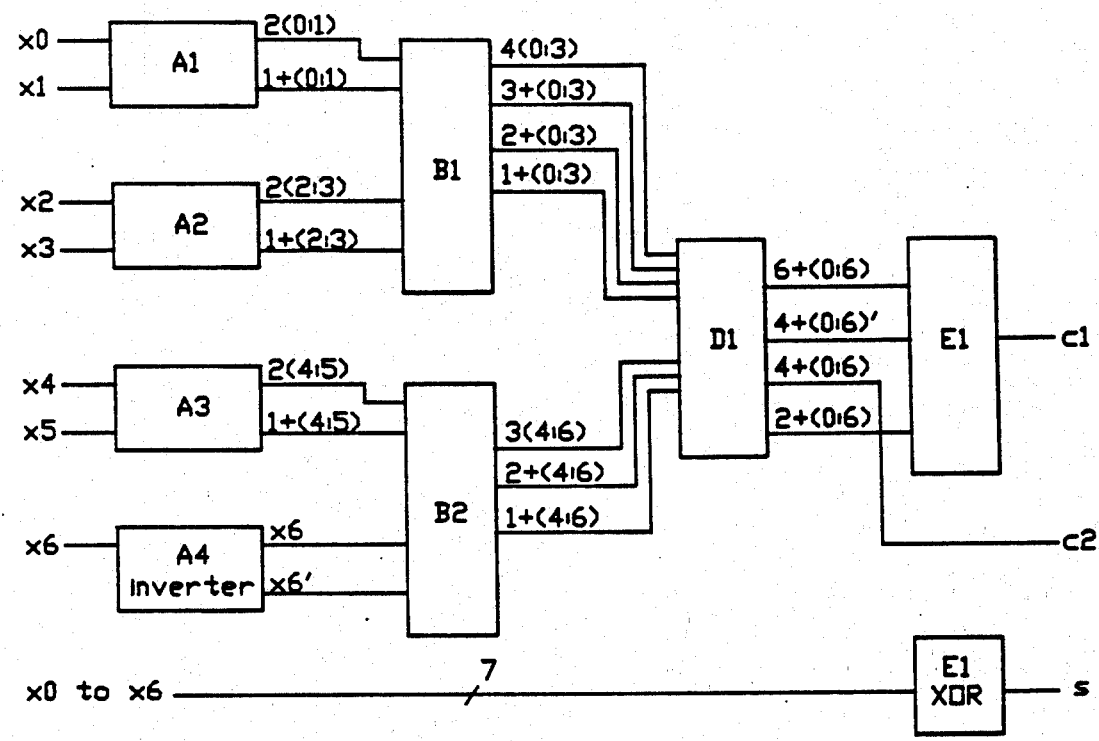
FIG. 4 is a schematic block diagrammatic view of a circuit implementation of a Type 0 7/3 counter constructed in accordance with the present invention.

Assume that the 7 elements to be reduced by the counter to 3 elements are binary digits ("bits") defined by X0, X1, X2, X3, X4, X5, and X6, and the 3 outputs element of the counter are bits defined by C2, C1, and S. Assume that none, some, or all elements can be negative. It can be stated that because of the commutativity of addition the ordering of $X_i$ has no significance, thus, they can be reordered with all the positive elements to the lower order subscripts (if any positive elements). In essence there are only 8 combinations of significance, as described in FIGS. 1A-H.

These 8 combinations are labelled alphabetically from A to H. FIGS. 1A-H can be interpreted as follows: A contains no negative elements, B contains one negative element, C contains two negative elements, D contains three negative elements, E contains four negative elements, F contains five negative elements, G contains six negative elements, and H has seven negative elements. The range of possible sums is also listed for each combination. Since all elements are either 0 or 1 with a possible sign of + or −, the minimum sum is produced when all the negative elements are 1 and all the positive elements are 0. The maximum is when all the positive elements are 1 and all the negative elements are 0. The ranges for combination A where there are 7 positive elements is 0 (since the sum of all negative elements equal to 1 is 0) to +7 (since the sum of all positive elements equal to 1 is +7). Thus, the ranges for all combinations can easily be found.

FIGS. 1A-H also show parenthesis in some combinations around C2, C1 and S. These parenthesis denote that the element contained within is a negative element. All 7 ranges can be represented by 3 elements which are either positive or negative and have a value of 1 or 0. The previous statement is proven by the following for each combination:

Let $X_i$, $C_i$, and S be the value of the i-th bit of the input elements, the i-th bit of the carries, and the sum, respectively, and let their lower case notation equal their magnitudes as follows: $x_i = |X_i|$, $c_i = |C_i|$, and $s = |S|$. In addition, assume that $c_2$, $c_1$ and s are properly weighted; i.e., in FIGS. 1A-H and FIGS. 2A-H the placement of these characters in successive columns implies a weighting of $2^2$, $2^1$, and $2^0$ respectively for these symbols.

Consider now the eight cases of FIGS. 1A-H, as follows:

Case A: Range 0 to +7

It must be proven that C2, C1 and S are all positive.

$$\sum_{i=0}^{6} X_i = C_2 2^2 + C_1 2^1 + S 2^0 \quad (1)$$

$$\sum_{i=0}^{6} x_i = c_2 2^2 + c_1 2^1 + s 2^0 \quad (2)$$

The sum is equal to 0, 1, 2, 3, 4, 5, 6, or 7. In FIG. 2A, the values of $c_2$, $c_1$, or s are shown in correspondence to the sum value. It can be easily verified with substitution that equation (1) and (2) hold true.

Case B: Range −1 to +6

It must be proven that C2 and C1 are positive and S is negative $$\sum_{i=0}^{6} X_i = C_2 2^2 + C_1 2^1 + S 2^0 \quad (1)$$

$$\sum_{i=0}^{5} x_i - x_6 = c_2 2^2 + c_1 2^1 - s 2^0 \quad (3)$$

The sum is equal to −1, 0, 1, 2, 3, 4, 5, or 6. In FIG. 2B, the values of $c_2$, $c_1$, or s are shown in correspondence to the sum value. It can be easily verified with substitution that equation (3) holds true.

Case C: Range −2 to +5

It must be proven that C2 and S are positive and C1 is negative.

$$\sum_{i=0}^{6} X_i = C_2 2^2 + C_1 2^1 + S 2^0 \quad (1)$$

$$\sum_{i=0}^{4} x_i - \sum_{i=5}^{6} x_i = c_2 2^2 - c_1 2^1 + s 2^0 \quad (4)$$

The sum is equal to −2, −1, 0, 1, 2, 3, 4, of 5. In FIG. 2C, the values of $c_2$, $c_1$, or s are shown in correspondence to the sum value. It can be easily verified with substitution that equation (4) holds true.

Case D: Range −3 to +4

It must be proven that C1 and S are negative and C2 is positive.

$$\sum_{i=0}^{6} X_i = C_2 2^2 + C_1 2^1 + S 2^0 \quad (1)$$

$$\sum_{i=0}^{3} x_i - \sum_{i=4}^{6} x_i = c_2 2^2 - c_1 2^1 - s 2^0 \quad (5)$$

The sum is equal to −3, −2, −1, 0, 1, 2, 3, or 4. In FIG. 2D, the values of $c_2$, $c_1$ or s are shown in correspondence to the sum value. It can be easily verified with substitution that equation (5) holds true.

Case E: Range −4 to +3

It must be proven that C1 and S are positive and C2 is negative.

$$\sum_{i=0}^{6} X_i = C_2 2^2 + C_1 2^1 + S 2^0 \quad (1)$$

$$\sum_{i=0}^{2} x_i - \sum_{i=3}^{6} x_i = -c_2 2^2 + c_1 2^1 + s 2^0 \quad (6)$$

The sum is equal to −4, −3, −2, −1, 0, 1, 2, or 3. In FIG. 2E, the values of $c_2$, $c_1$, or s are shown in correspondence to the sum value. It can be easily verified with substitution that equation (6) holds true.

Case F: Range −5 to +2

It must be proven that C2 and S are negative and C1 is positive.

$$\sum_{i=0}^{6} X_i = C_2 2^2 + C_1 2^1 + S 2^0 \quad (1)$$

$$\sum_{i=0}^{1} x_i - \sum_{i=2}^{6} x_i = -c_2 2^2 + c_1 2^1 - s 2^0 \quad (7)$$

The sum is equal to $-5, -4, -3, -2, -1, 0, 1,$ or $2$. In FIG. 2F, the values of $c_2, c_1,$ or $s$ are shown in correspondence to the sum value. It can be easily verified with substitution that equation (7) holds true.

Case G: Range $-6$ to $+1$

It must be proven that C1 and C2 are negative and S is positive.

$$\sum_{i=0}^{6} X_i = C_2 2^2 + C_1 2^1 + S 2^0 \quad (1)$$

$$x_0 - \sum_{i=1}^{6} x_i = -c_2 2^2 - c_1 2^1 + s 2^0 \quad (8)$$

The sum is equal to $-6, -5, -4, -3, -2, -1, 0$ or $1$. In FIG. 2G, the values of $c_2, c_1,$ or $s$ are shown in correspondence to the sum value. It can be easily verified with substitution that equation (8) holds true.

Case H: Range $-7$ to $0$

It must be proven that C1, C2, and S are all negative.

$$\sum_{i=0}^{6} X_i = C_2 2^2 + C_1 2^1 + S 2^0 \quad (1)$$

$$-\sum_{i=0}^{6} x_i = -c_2 2^2 - c_1 2^1 - s 2^0 \quad (9)$$

The sum is equal to $-7, -6, -5, -4, -3, -2, -1,$ or $0$. In FIG. 2H, the values of $c_2, c_1,$ or $s$ are shown in correspondence to the sum value. It can be easily verified with substitution that equation (9) holds true.

Thus, FIGS. 2A-H correctly describe for all combinations the sign of the three outputs C2, C1, and S.

B. Relationships Between Counter Types

In general, two Boolean functions are equivalent if for any input the two functions will produce the same value (i.e., two Boolean functions are equivalent if they have the same truth table). FIGS. 2A-H indicate the following combinations: A and H, B and G, C and F, and D and E have the same truth table. In view of these Figures, the inventors have made the critical observation that equivalent functions are inherent by combination pairs in which the bit sign pattern of one combination is the logical inverse of the bit sign pattern of the other. This is because the following holds true. Combination A indicates that $s=1$ if $|sum|$ is equal to $1,3,5,$ and $7$ (i.e. the first bit of the three bit output is one if one of the seven bits is "on," any three bits are "on," any 5 bits are "on," any 7 bits are "on"). Bit s in combination H is "on" if $|sum|$ is equal to $1,3,5,$ and $7$ (i.e. the first bit of the three bit output is one if one of the seven bits is "on," any three bits are "on," any 5 bits are "on," any 7 bits are "on"). The same procedure can be applied to the other two bits in FIGS. 2A and 2H, to prove the equivalence. In essence, what is stated is that if the naming is not taken into account (i.e. S assumes [0,1]but is designated as s and (s)), the design of the Boolean circuits will be the same for combination A : H. In other words, the circuit will produce the same outputs given an input combination when the meaning of the output is not taken into account.

In essence, the design needed is a single circuit that can be used for any appropriate combination. The same proof can be applied to combinations B:G, C:F, and D:E using FIGS. 2B-F, justifying the use of one circuit for each combination. Thus, there is a need to design four rather than eight circuits for the appropriate combinations.

C. Type 0 7/3 Counter

The type 0 7/3 counter is used for combination A and combination H. This counter counts how many of the 7 elements are equal to one and returns the result through the secondary carry, $c_2$, the primary carry, $c_1$ and the sum bit, $s$.

To express the count of a group of input elements in compact form we adopt the following notation: Let $\Gamma+_{(\alpha:\beta)}$ and $\Gamma+(\alpha:\beta)$ indicate that there are at least $\Gamma$ elements "on" when the elements from $\alpha$ to $\beta$ are considered. For instance $4+(0:6)=4+(0:6)$ indicates that there are at least 4 elements "on" out of 7. Also, let $\Gamma+_{(\alpha:\beta)}'$ and $\Gamma+(\alpha:\beta)'$ indicate that there are at least $\Gamma$ elements "off" when the elements from $\alpha$ to $\beta$ are considered, and let $\Gamma_{(\alpha:\beta)}$ and $\Gamma(\alpha:\beta)$ indicate that there are exactly $\Gamma$ elements "on" when the elements from $\alpha$ to $\beta$ are considered. If $\Gamma$ is stated without a subscript it is assumed to pertain to the total sum of all 7 inputs. Thus, a concise description is established of the sum of any group of input elements which when describing the sum of all 7 inputs becomes very useful in describing the 3 outputs.

The 3 outputs and 7 inputs are described for combination A and H in FIG. 3A. Also, the sums represented by combinations of the output bits are also shown which verifies the equivalence of the two combinations as was proven above in Section B.

In the discussion following, and in the discussion of the other 7/3 counters, Boolean logic equations will be derived which fully describe various counter components. In these equations, "+" denotes the OR operation, juxtaposition denotes the AND operation, and "V" denotes the EXCLUSIVE-OR operation. Further, both an apostrophe and overlining denote inversion; thus, $x' = \overline{x}$.

The logic equations for determining $c_2, c_1$ and $s$ will be derived assuming combination A but equally apply for combination H. We know from FIG. 3A that the secondary carry $c_2$ is equal to a 1 if the sum of all the elements is 4, 5, 6, or 7, indicating that $c_2=1$ iff (if and only if) there are at least 4 elements "on", i.e. $c_2=4+_{(0:6)}$.

$$c_2 = (4,5,6,7) = (4,5,6,7)_{(0:6)} = 4+_{(0:6)}$$

The primary carry $c_1$ is equal to 1 iff the total sum is equal to 2, 3, 6, or 7, as is shown in the following equation and derived from FIG. 3A.

$$c_1 = (2,3,6,7) = (2,3,6,7)_{(0:6)}$$

$$c_1 = (2,3,6,7)_{(0:6)}$$

Since exact sums require a longer delay, the equation is rewritten to use faster equivalent terms as follows:

$c_1 = 4^+_{(0:6)} 2^+_{(0:6)} + 6^+_{(0:6)}$, implying two 2-way AND gates which feed a 2-way OR gate.

The sum is equal to 1 iff the total sum is equal to 1, 3, 5, or 7, which is equivalent to an exclusive-OR of all the inputs.

$s = (1,3,5,7)$, implying an exclusive-OR of all elements $s = x_0 V x_1 V x_2 V x_3 V x_4 V x_5 V x_6$ FIG. 4 shows an implementation of the Type 0 7/3 counter with building blocks A1, A2, A3, A4, B1, B2, D1, and E1. Due to technology constraints, it is preferable to build to a six bit group by first building sum terms from two bit groups in the A level. These two bit groups are then combined in the B level to 3- and 4-bit groups. The D level receives these 7- bit groups and generates $c_2$ and the 3 constructs necessary for solving the $c_1$ equation at the final level E. These blocks, which may be formed from conventional logic components, are described in detail by the following equations. The equations are accompanied by parenthetical notation signifying the logic structures which implement them. In this notation, the basic elements are multi-input ("multi-way") AND and OR gates. Thus, a "two-way" AND gate is one with two inputs. In addition, the notation "AO" signifies an OR gate which derives its inputs from the outputs of AND gates. The AO designation is preceeded by "ix", where "j" denotes how many AND gates feed the OR gate and "i" the number of inputs which each AND gate has. In some AO expressions, one or more of the OR'd terms may include only a single variable; in each of these cases, the variable is ANDed with a "1" to maintain the two-way AND gate represented by the term. The notation "I", when appended to a term, signifies inversion of the term; thus, the term "2×3AOI" signifies inversion of the output of a three-way OR gate, each of whose inputs is connected to the output of a two-way AND gate.

<u>A1, A2, A3</u>
$2_{(i:i+1)} = x_i x_{i+1}$ (2wayAND)
$1^+_{(i:i+1)} = (x_i + x_{i+1})$ (2wayOR)
<u>B1</u>
$4_{(0:3)} = 2_{(0:1)} 2_{(2:3)}$ (2wayAND)
$3^+_{(0:3)} = 2_{(0:1)} 1^+_{(2:3)} + 1^+_{(0:3)} 2_{(2:3)}$ (2 × 2AO)
$2^+_{(0:3)} = 2_{(0:1)} + 1^+_{(0:1)} 1^+_{(2:3)} + 2_{(2:3)}$ (2 × 3AO)
$1^+_{(0:3)} = 1^+_{(0:1)} + 1^+_{(2:3)}$ (2wayOR)
<u>B2</u>
$3_{(4:6)} = 2_{(4:5)} x_6$ (2wayAND)
$2^+_{(4:6)} = 2_{(4:5)} + 1^+_{(4:5)} x_6$ (2 × 2AO)
$1^+_{(4:6)} = 1^+_{(4:5)} + x_6$ (2wayOR)
<u>D1</u>
$6^+_{(0:6)} = 4_{(0:3)} 2^+_{(4:6)} + 3^+_{(0:3)} 3_{(4:6)}$ (2 × 2AO)
$4^+_{(0:6)} = 4_{(0:3)} + 3^+_{(0:3)} 1^+_{(4:6)} + 2^+_{(0:3)} 2^+_{(4:6)} + 1^+_{(0:3)} 3_{(4:6)}$ (2 × 4AO)
$4^+_{(0:6)}{}' = \overline{[4_{(0:3)} + 3^+_{(0:3)} 1^+_{(4:6)} + 2^+_{(0:3)} 2^+_{(4:6)} + 1^+_{(0:3)} 3_{(4:6)}]}$ (2 × 4AOI)
$2^+_{(0:6)} = 2^+_{(0:3)} + 1^+_{(0:3)} 1^+_{(4:6)} + 2^+_{(4:6)}$ (2 × 3AO)
<u>E1</u>

-continued $c_1 = 4^+_{(0:6)}{}' 2^+_{(0:6)} + 6^+_{(0:6)}$ (2 × 2AO)
$c_2 = 4^+_{(0:6)}$
$s = x_0 V x_1 V x_2 V x_3 V x_4 V x_5 V x_6$ (7wayOR)

The building blocks A1, A2, A3, A4, B1, B2, D1, and E1 are fully described by the logic equations given above. However, for absolute clarity, FIGS. 8A–8F illustrate those blocks in greater detail, showing the relationship of the equations to specific conventional logic components in the form of AND, OR, EXCLUSIVE-OR, and an inverting elements. In those AND gates where a single value is gated, such as the AND gate 100 in FIG. 8C, a voltage level ($V_+$) is fed to the AND gate to provide a constant positive digital level.

Type 1 7/3 Counter

The Type 1 counter is used to sum 6 elements either positive (combination B) or negative (combination G) and 1 element of the opposite sign. It produces three outputs: the two carries which are necessarily either positive (combination B) or negative (combination G) and a sum bit which is the opposite sign. FIG. 3B describes the inputs and outputs for the two combinations which use the same combinatorial logic circuit as was proven above in Section 3 and is evident from FIG. 3B.

Note that FIG. 3B differs from FIG. 1B, in that this combination has been reordered to have negative elements in the lower combinations. (Note: As stated above, because of commutativity of addition the ordering of $X_i$ has no significance.)

An additional notation is introduced in this section: $\Gamma = (neg = \Theta_1, \theta_2, \ldots \theta_n) (pos = y_1, y_2, \ldots y_n)$. This notation reads $\Gamma$ is equal to 1 if there are some $\Theta$ number of negative elements and some y number of positive elements. The equations will be derived assuming combination B but equally apply for combination G.

$s = -1, 1, 3, 5$
$s = (neg = 0)(pos = 1,3,5) + (neg = 1)(pos = 0,2,4,6)$
$s = \bar{x}_6 (1,3,5)_{(0:5)} + x_6 (0,2,4,6)_{(0:5)}$
$s = \bar{x}_6 (x_0 V x_1 V x_2 V x_3 V x_4 V x_5) + x_6 (1 V x_0 V x_1 V x_2 V x_3 V x_4 V x_5)$
$s = x_0 V x_1 V x_2 V x_3 V x_4 V x_5 V x_6$
$c_1 = 1, 2, 5, 6$
$c_1 = (neg = 0)(pos = 1,2,5,6) + (neg = 1)(pos = 2,3,6)$
$c_1 = \bar{x}_6 (1^+_{(0:5)} 3^+_{(0:5)}{}' + 5^+_{(0:5)}) + x_6 (2^+_{(0:5)} 4^+_{(0:5)}{}' + 6_{(0:5)})$
$c_1 = 1^+_{(0:5)} 3^+_{(0:5)} \bar{x}_6 + 5^+_{(0:5)} x_6 + 2^+_{(0:5)} 4^+_{(0:5)} x_6 + 6_{(0:5)} x_6$
$c_2 = 3, 4, 5, 6$
$C_2 = (neg = 0)(pos = 3,4,5,6) + (neg = 1)(pos = 4,5,6)$
$C_2 = \bar{x}_6 3^+_{(0:5)} + x_6 4^+_{(0:5)}$ Thus, the output equations have been derived in terms of elements from 0 to 5 and element 6. A description of how these quantities may be assembled is given in FIG. 5.

<u>A1,A2</u>
$3_{(i:i+2)} = x_i x_{i+1} x_{i+2}$ (3wayAND)
$2^+_{(i:i+2)} = x_i x_{i+1} + x_i x_{i+2} + x_{i+1} x_{i+2}$ (2 × 3AO)
$1^+_{(i:i+2)} = x_i + x_{i+1} + x_{i+2}$ (3wayOR)
<u>B1</u>
$1^+_{(0:5)} = 1^+_{(0:2)} + 1^+_{(3:5)}$ (2wayOR)
$2^+_{(0:5)} = 2^+_{(0:2)} + 1^+_{(0:2)} 1^+_{(3:5)} + 2^+_{(3:5)}$ (2 × 3AO)
$3^+_{(0:5)} = 3_{(0:2)} + 2^+_{(0:2)} 1^+_{(3:5)} + 1^+_{(0:2)} 2^+_{(3:5)} + 3_{(3:5)}$ (2 × 4AO)

-continued $3^+_{(0:5)}' = \overline{(3_{(0:2)} + 2^+_{(0:2)}1^+_{(3:5)} + 1^+_{(0:2)}2^+_{(3:5)} + 3_{(3:5)})}$ (2 × 4AOI)

$4^+_{(0:5)} = 3_{(0:2)}1^+_{(3:5)} + 2^+_{(0:2)}2^+_{(3:5)} + 1^+_{(0:2)}3_{(3:5)}$ (2 × 3AO)

$4^+_{(0:5)}' = \overline{(3_{(0:2)}1^+_{(3:5)} + 2^+_{(0:2)}2^+_{(3:5)} + 1^+_{(0:2)}3_{(3:5)})}$ (2 × 3AOI)

$5^+_{(0:5)} = 3_{(0:2)}2^+_{(3:5)} + 2^+_{(0:2)}3_{(3:5)}$ (2 × 2AO)

$6_{(0:5)} = 3_{(0:2)}3_{(3:5)}$ (2wayAND)

D1

$s = x_0 \vee x_1 \vee x_2 \vee x_3 \vee x_4 \vee x_5 \vee x_6$ $c_2 = \bar{x}_6 3^+_{(0:5)} + x_6 4^+_{(0:5)}$ (2 × 2AO)

$c_1 = 1^+_{(0:5)} 3^+_{(0:5)}' \bar{x}_6 + 5^+_{(0:5)} \bar{x}_6 + 2^+_{(0:5)} 4^+_{(0:5)}' x_6 + 6_{(0:5)} x_6$ (3 × 4AO)

E. Type 2 7/3 Counter

The Type 2 counter is used to sum 5 elements either positive (combination C) or negative (combination F) and 2 elements of the opposite sign. It produces three outputs: the secondary carry and the sume which are necessarily either positive (combination C) or negative (combination F), and a primary carry bit which is the opposite sign. FIG. 3C described the inputs and outputs for the two combinations which use he same combinatorial logic circuit as was proven above in Section B and is evident from FIG. 3C.

The equations will e derived assuming combination C but equally apply for combination F.

$s = -1, 1, 3, 5$ $s = (neg = 0)(pos = 1,3,5) + (neg = 1)(pos = 0,2,4) + (neg = 2)(pos = 1,3,5)$ $s = x_0 \vee x_1 \vee x_2 \vee x_3 \vee x_4 \vee x_5 \vee x_6$ $c_1 = -2, -1, 2, 3$ $c_1 = (pos = 0,1)(neg = 2) + (pos = 0)(neg = 1,2) + (pos = 2,3)(neg = 0) + (pos = 3,4)(neg = 1) + (pos = 4,5)(neg = 2)$ $c_1 = 2^+_{(0:4)} 2_{(5:6)} + 0_{(0:4)} 1^+_{(5:6)} + 2^+_{(0:4)} 4^+_{(0:4)} 0_{(5:6)} + 3^+_{(0:4)} 5_{(0:4)} 1_{(5:6)} + 4^+_{(0:4)} 2_{(5:6)}$ (3 × 5AO)

$C_2 = 2, 3, 4, 5$ $c_2 = (neg = 0)(pos = 2,3,4,5) + (neg = 1)(pos = 3,4,5) + (neg = 2)(pos = 4,5)$ $c_2 = 2^+_{(0:4)} 0_{(5:6)} + 3^+_{(0:4)} 1_{(5:6)} + 4^+_{(0:4)}$ (2 × 3AO)

Figure 6:
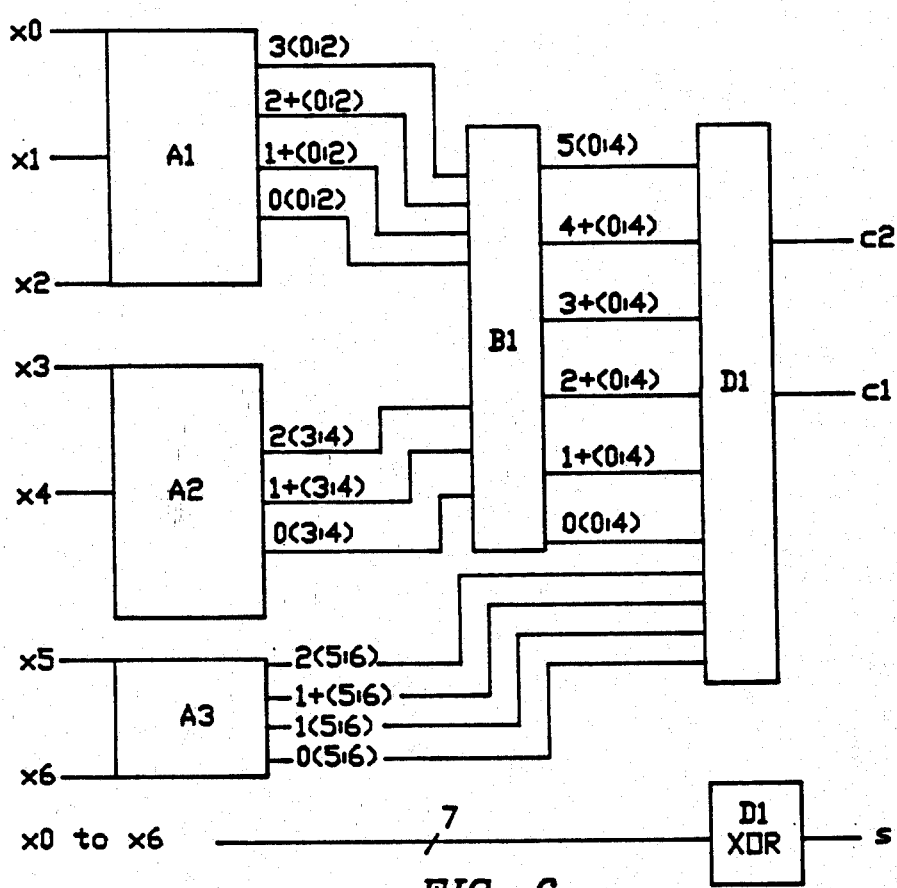
FIG. 6 is a schematic block diagrammatic view of a circuit implementation of a Type 2 7/3 counter constructed in accordance with the present invention.

Thus, the outputs have been described in terms of two groups of elements: those from 0 to 4 and those from 5 to element 6. In FIG. 6 there is described the creation of the preliminary terms required to produce the final outputs. Each block can be described from the following equations:

A1

$3_{(i:i+2)} = x_i x_{i+1} x_{i+2}$ (3wayAND)

$2^+_{(i:i+2)} = x_i x_{i+1} + x_i x_{i+2} + x_{i+1} x_{i+2}$ (2 × 3AO)

$1^+_{(i:i+2)} = x_i + x_{i+1} + x_{i+2}$ (3wayOR)

$0^+_{(i:i+2)} = \overline{(x_i + x_{i+1} + x_{i+2})}$ (3wayNOR)

A2,A3

$2_{(i:i+1)} = x_i x_{i+1}$ (2wayAND)

$1^+_{(i:i+2)} = (x_i + x_{i+1})$ (2wayOR)

$1_{(i:i+1)} = (x_i \vee x_{i+1})$ (2wayXOR)

$0_{(i:i+1)} = \overline{(x_i + x_{i+1})}$ (2wayNOR)

B1

$0_{(0:4)} = 0_{(0:2)} 0_{(3:4)}$ (2wayAND)

$1^+_{(0:4)} = 1^+_{(0:2)} + 1^+_{(3:4)}$ (2wayOR)

$2^+_{(0:4)} = 2^+_{(0:2)} + 1^+_{(0:2)} 1^+_{(3:4)} + 2_{(3:4)}$ (2 × 3AO)

$2^+_{(0:4)}' = \overline{(2^+_{(0:2)} + 1^+_{(0:2)} 1^+_{(3:4)} + 2_{(3:4)})}$ (2 × 3AOI)

-continued $3^+_{(0:4)} = 3_{(0:2)} + 2^+_{(0:2)} 1^+_{(3:4)} + 1^+_{(0:2)} 2_{(3:4)}$ (2 × 3AO)

$4^+_{(0:4)} = 3_{(0:2)} 1^+_{(3:4)} + 2^+_{(0:2)} 2_{(3:4)}$ (2 × 2AO)

$4^+_{(0:4)}' = \overline{(3_{(0:2)} 1^+_{(3:4)} + 2^+_{(0:2)} 2_{(3:4)})}$ (2 × 2AOI)

$5_{(0:4)} = 3_{(0:2)} 2_{(3:4)}$ (2wayAND)

$5_{(0:4)}' = \overline{(3_{(0:2)} 2_{(3:4)})}$ (2wayNAND)

D1

$s = x_0 \vee x_1 \vee x_2 \vee x_3 \vee x_4 \vee x_5 \vee x_6$ $c_1 = -1, -2, 2, 3$ $c_1 = 2^+_{(0:4)}' 2_{(5:6)} + 0_{(0:4)} 1^+_{(5:6)} + 2^+_{(0:4)} 4^+_{(0:4)}' 0_{(5:6)} + 3^+_{(0:4)} 5_{(0:4)}' 1_{(5:6)} + 4^+_{(0:4)} 2_{(5:6)}$ (3 × 5AO)

$c_2 = 2^+_{(0:4)} 0_{(5:6)} + 3_{(0:4)} 1_{(5:6)} + 4^+_{(0:4)}$ (2 × 3AO)

F. Type 3 7/3 Counter

The Type 3 counter is used to sum 4 elements either positive (combination D) or negative (combination E) and 3 elements of the opposite sign. It produces three outputs: the secondary carry which is necessarily either positive (combination D) or negative (combination E), and the primary carry and sum bit which are the opposite sign. FIG. 3D described the inputs and outputs for the two combinations which use the same combinatorial logic circuit was was proven above in Section B and is evident from FIG. 3D.

The equations will be derived assuming combination D but equally apply for combination E.

$s = -3, -1, 1, 3$ $s = (neg = 0)(pos = 1,3) + (neg = 1)(pos = 0,2,4) + (neg = 2)(pos = 1,3) + (neg = 3)(pos = 0,2,4)$ $s = x_0 \vee x_1 \vee x_2 \vee x_3 \vee x_4 \vee x_5 \vee x_6$ $c_1 = -3, -2, 1, 2$ $c_1 = (pos = 0)(neg = 2,3) + (pos = 0,1)(neg = 3) + (pos = 1,2)(neg = 0) + (pos = 2,3)(neg = 1) + (pos = 3,4)(neg = 2) + (pos = 4)(neg = 2,3)$ $c_1 = 0_{(0:3)} 2^+_{(4:6)} + 2^+_{(0:3)} 3^+_{(4:6)} + 1^+_{(0:3)} 3^+_{(0:3)} 0_{(4:6)} + 2^+_{(0:3)} 4^+_{(0:3)} 1_{(4:6)} + 3^+_{(0:3)} 2^+_{(4:6)} 3_{(4:6)}' + 4_{(0:3)} 2^+_{(4:6)}$ (3 × 6AO)

$c_2 = 1, 2, 3, 4$ $c_2 = (neg = 0)(pos = 1,2,3,4) + (neg = 1)(pos = 2,3,4) + (neg = 2)(pos = 3,4) + (neg = 3)(pos = 4)$ $c_2 = (neg = 0)(pos = 1^+) + (neg = 1)(pos = 2^+) + (neg = 2)(pos = 3^+) + (neg = 3)(pos = 4)$ $c_2 = 1^+_{(0:3)} 1^+_{(4:6)}' + 2^+_{(0:3)} 2^+_{(4:6)}' + 3^+_{(0:3)} 3^+_{(4:6)}' + 4_{(0:3)}$ (2 × 4AO)

Figure 7:
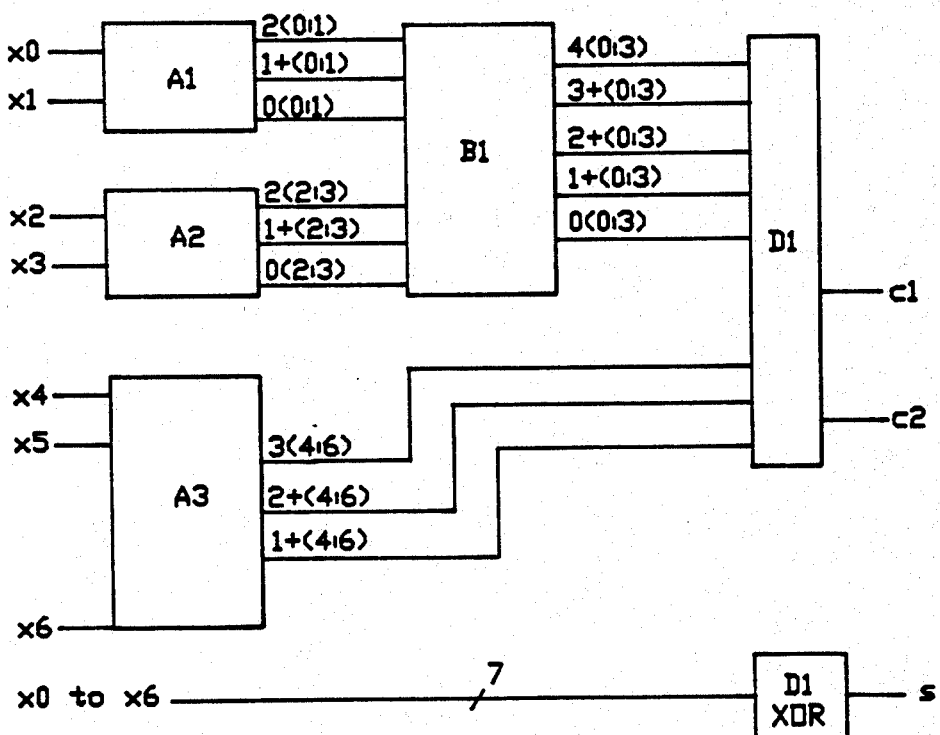
FIG. 7 is a schematic block diagrammatic view of a circuit implementation of a Type 3 7/3 counter constructed in accordance with the present invention.

FIG. 7 describes the creation of the preliminary terms required to produce the final outputs. The details of each block in FIG. 4 are described as follows:

A1,A2

$2_{(i:i+1)} = x_i x_{i+1}$ (2wayAND)

$1^+_{(i:i+1)} = (x_i + x_{i+1})$ (2wayOR)

$1_{(i:i+1)} = (x_i \vee x_{i+1})$ (2wayXOR)

$0_{(i:i+1)} = \overline{(x_i + x_{i+1})}$ (2wayNOR)

A3

$3_{(i:i+2)} = x_i x_{i+1} x_{i+2}$ (3wayAND)

$3_{(i:i+2)}' = \overline{(x_i x_{i+1} x_{i+2})}$ (3wayNAND)

$2^+_{(i:i+2)} = (x_i x_{i+1} + x_i x_{i+2} + x_{i+1} x_{i+2})$ (2 × 3AO)

$2^+_{(i:i+2)}' = \overline{(x_i x_{i+1} + x_i x_{i+2} + x_{i+1} x_{i+2})}$ (2 × 3AOI)

$1^+_{(i:i+2)} = x_i + x_{i+1} + x_{i+2}$ (3wayOR)

$1^+_{(i:i+2)}' = \overline{(x_i + x_{i+1} + x_{i+2})}$ (3wayNOR)

$0_{(i:i+2)} = \overline{(x_i + x_{i+1} + x_{i+2})}$ (3wayNOR)

$1_{(i:i+2)} = x_i \bar{x}_{i+1} \bar{x}_{i+2} + \bar{x}_i x_{i+1} \bar{x}_{i+2} + \bar{x}_i \bar{x}_{i+1} x_{i+2}$ (3 × 3AO)

B1

-continued $4_{(0:3)} = \overline{2_{(0:1)}2_{(2:3)}}$ (2wayAND)

$4_{(0:3)}' = \overline{(2_{(0:1)}2_{(2:3)})}$ (2wayNAND)

$3^+_{(0:3)} = 2_{(0:1)}1^+_{(2:3)} + 1^+_{(0:1)}2_{(2:3)}$ (2 × 2AO)

$3^+_{(0:3)}' = \overline{(2_{(0:1)}1^+_{(2:3)} + 1^+_{(0:1)}2_{(2:3)})}$ (2 × 2AOI)

$2^+_{(0:3)} = 2_{(0:1)} + 1^+_{(0:1)}1^+_{(2:3)} + 2_{(2:3)}$ (2 × 3AO)

$2^+_{(0:3)}' = \overline{(2_{(0:1)} + 1^+_{(0:1)}1^+_{(2:3)} + 2_{(2:3)})}$ (2 × 3AOI)

$1^+_{(0:3)} = 1^+_{(0:1)} + 1^+_{(2:3)}$ (2wayOR)

$0_{(0:3)} = 0_{(0:1)}0_{(2:3)}$ (2wayAND)

<u>D1</u>

Figure 5:
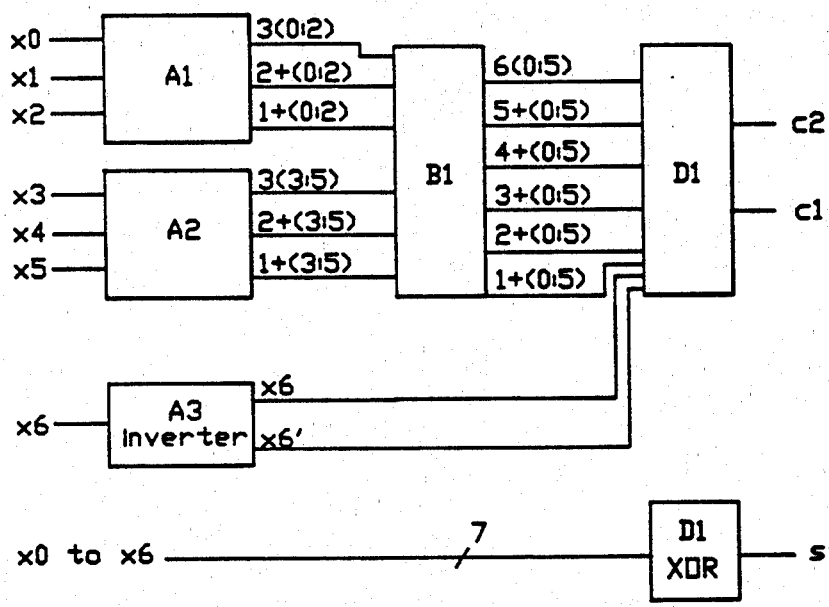
FIG. 5 is a schematic block diagrammatic view of a circuit implementation of a Type 1 7/3 counter constructed in accordance with the present invention.

$s = x_0 V x_1 V x_2 V x_3 V x_3 V x_4 V x_5 V x_6$ $c_1 = -2, -3, 1, 2$ $c_1 = 0_{(0:3)}2^+_{(4:6)} + 2^+_{(0:3)}3_{(4:6)} + 1^+_{(0:3)}3^+_{(0:3)}0_{(4:6)} +$
$2^+_{(0:3)}4_{(0:3)}1_{(4:6)} + 3^+_{(0:3)}2^+_{(4:6)}3_{(4:6)}' + 4_{(0:3)}2^+_{(4:6)}$
$3 \times 6AO$ $c_2 = 1^+_{(0:3)}1^+_{(4:6)}' + 2^+_{(0:3)}2^+_{(4:6)}' + 3^+_{(0:3)}3_{(4:6)}' + 4_{(0:3)}$
$2 \times 4AO$ The circuit implementations of FIGS. 5–7 are thus shown as including 7 input lines $s_0$–$x_6$, 3 output lines, $C_2$, $C_1$, and S, and several stages of logical components which in combination receive a 7 digit input value from the input lines $x_0$–$x_6$ and produce a three digit weighted output value to the output lines $C_2$, $C_1$, and S. In a data processing system, the four circuit implementations of FIGS. 5–7 could be selected by appropriate testing circuitry that categorizes successive groups of seven input digits in accordance with the combinations of FIGS. 3A–3D and inputs them to the selected circuit.

INDUSTRIAL APPLICATION

Figure 9:
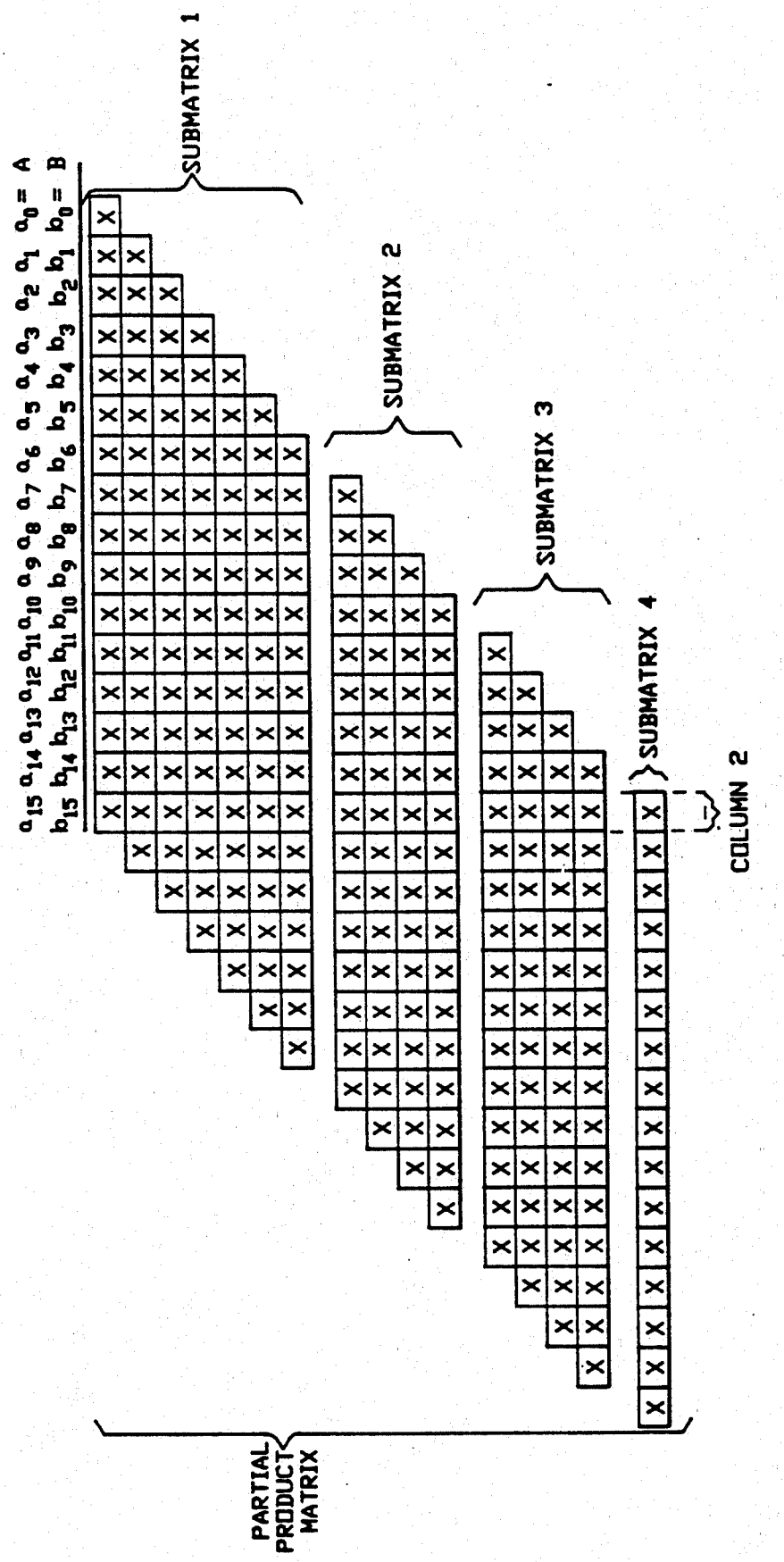
FIG. 9 illustrates an industrial application of the 7/3 counter of the invention in a 16 by 16 multiplier.
Figure 10:
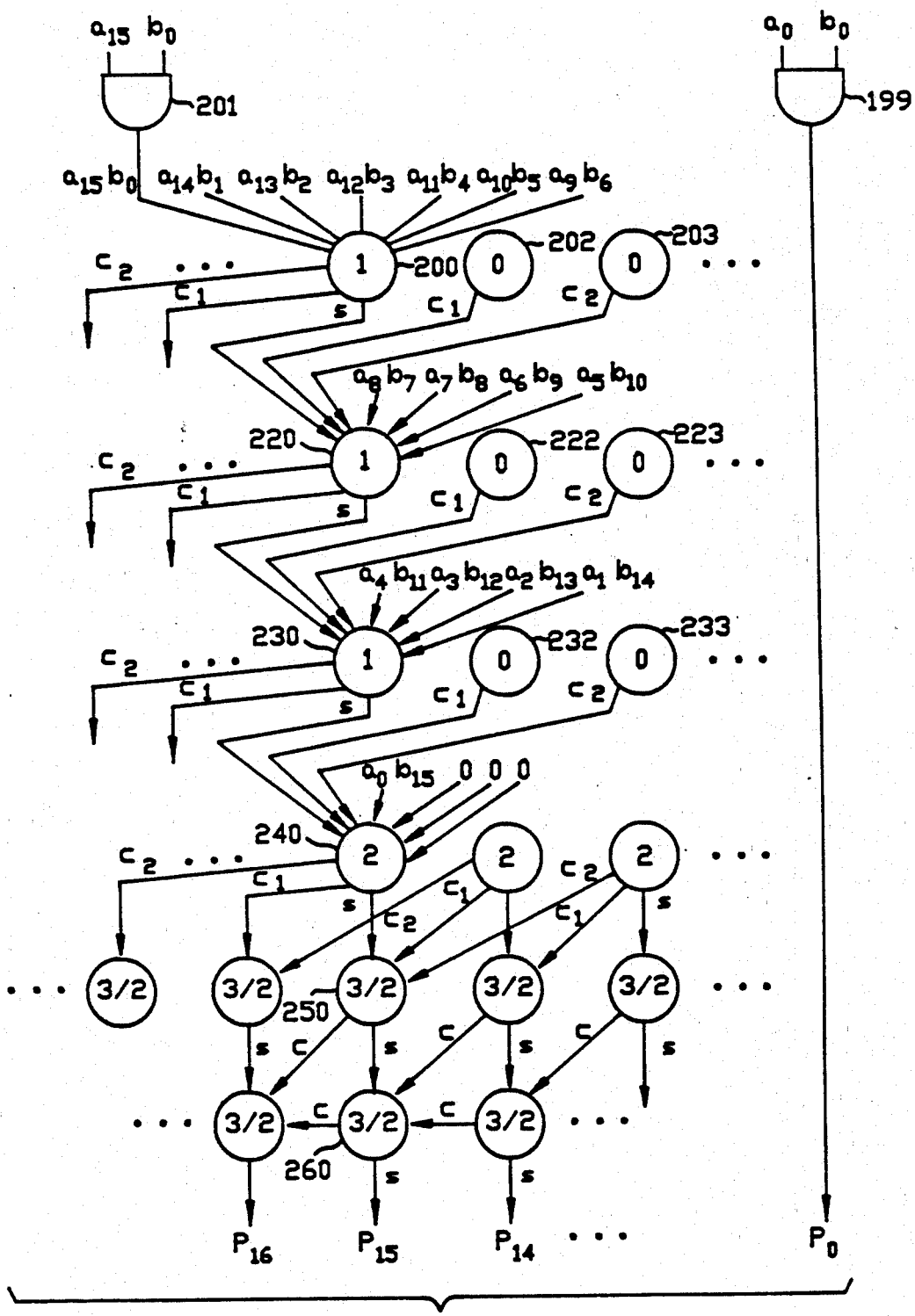
FIG. 10 illustrates submatrix interconnection and output details of the multiplier FIG. 9.

An industrial application of the 7/3 counter of the invention can be understood with reference to FIGS. 9 and 10. In FIG. 9, the multiplication of two 16-bit numbers A and B is illustrated. This representation is conventional and can be found, for example, in the above-cited Hwang reference. Each of the numbers being multiplied include 16 bits with the bits of the number A being represented in increasing significance from $a_0$ through $a_{15}$, and those for the number B by $b_0$ through $b_{15}$. As is known, the multiplication process is represented by a partial product matrix such as is illustrated in FIG. 9. Each row of the matrix represents the multiplication of A by a respective bit of B; each position of each row represents the multiplication of a respective bit of A by the respective bit of B. Conventionally, the product of $a_i b_j$ is represented by the AND function.

For the purpose of implementing the partial product matrix in an array multiplier of the Pezaris-type using the 7/3 counters of the invention, the partial product matrix is subdivided into four submatrices, submatrix 1–submatrix 4. Each column of submatrices 1, 2 and 3, can be implemented with a particular type of 7/3 counter, with the counter outputs cascading downwardly from submatrix 1 through submatrix 4 as illustrated in FIG. 10.

FIG. 10 shows a vertical slice of the partial product matrix taken along column Z, which extends through all of the submatrices. As FIG. 10 shows, utilization of 7/3 counters for the columns of submatrix 1 reduces the seven rows of the submatrix, while use of the 7/3 counters in submatrices 2 and 3 reduces at most four rows. Submatrix 4 implies a 4/3 reduction, with the final product being obtained from a 3/1 reduction using 3/2 counters.

In the matrix of FIG. 9, all 7/3 counters in column Z are type 1 for submatrices 1, 2 and 3. All 7/3 counters for submatrix 4 are type 2 counters. All other 7/3 counters in submatrices 1, 2 and 3 are type 0 counters.

Respecting FIG. 10, in submatrix 1, the counter 200 receives as inputs all of the terms in the portion of column Z in the submatrix. Each term represents the product of respective bits of the numbers A and B; these products are produced by combining the bits in AND gates. For example the AND gate 201 combines bits $a_{15}$ and $b_0$ to produce the partial product $a_{15}b_0$. All partial products in the portion of column Z contained in submatrix 1 are provided as inputs to the counter 200. In other columns having fewer than seven partial products, the extra inputs receive zeros. The counter 200 produces outputs S, $C_1$ and $C_2$ which are fed to respective 7/3 counters in submatrix 2. In the portion of column Z in the submatrix 2, the 7/3 counter 220 receives the S output produced by the counter 200, the $C_1$ output produced by the counter 202 in row Z-1 1 of submatrix 1, and the $C_2$ output produced by the counter 203 in column Z-2 of submatrix 1. In addition, the counter 220 in column Z of submatrix 2 receives the four partial products in that column, and combines them as described above to produce S, $C_1$ and $C_2$ outputs. The type 1 7/3 counter 230 in column Z of submatrix 3 receives the S output produced by counter 220, the $C_1$ output produced by the type 0 counter 222 in column Z-1 of submatrix 2 and the $C_2$ output of the type 0 7/3 counter 223 in column Z-2 of submatrix 2. In addition, four partial terms in column Z of submatrix 3 are provided as inputs to the counter 230. The counters in the column positions of submatrix 4 perform 4/3 reductions. For example, type 2 7/3 counter 240 in the column Z position receives three counter outputs, one each from counters 230, 232, and 233 in columns Z, Z-1 and Z-2 of submatrix 3 and combines them with the one partial product $a_0 b_{15}$ at the column Z position in submatrix 4. The remaining three inputs to the counter 240 are zeros.

The final product P is a 32 bit-number including bits $p_0$ through $p_{31}$ in order of increasing significance. These bits are produced by 3/1 additions as illustrated in FIG. 10. The least significant bit of the product, $p_0$, is simply taken as the output of the AND gate 199 which produces the partial product $a_0 b_0$. All other product bits are produced by cascading 3/2 adders (or counters). For example, the product bit $p_{15}$ positioned beneath column Z in the partial product matrix is produced by 3/2 adders 250 and 260 connected as shown. The first row of 3/2 adders, including the adder 250, performs 3/2 reduction of outputs produced by 7/3 counters in the partial product matrix of FIG. 9, including all of the counters of submatrix 4 and the bottom-most counters in the columns ascending to the upper right through submatrices 3, 2, and 1, beginning at column Z-1 in submatrix 3. Each 3/2 adder in the row including the adder 250 combines the three inputs as shown to produce sum(s) and carry (c) outputs. These outputs are combined in a row of 3/2 adders including the adder 260 with each of these adders receiving as inputs the S output of the 3/2 adder immediately above it, a C output from the adder above it to the right, and the C output from the adder to the right of it in its own row. The S outputs from the bottom-most row of 3/2 adders are provided as the bits of the product P.

Accordingly, a generalized 7/3 counter has been proposed and its implementation has been derived and described. Using this counter versus the Pezaris 3/2 counter will significantly reduce the number of counters and counter stages needed for the implementation of a two's complement array multiplier. While embodiments of the present invention have been shown and described, it will be appreciated that many modifications would be apparent to those skilled in the art. The invention, therefore, should not be limited except in accordance with the spirit of the appended claims and their equivalents.

What is claimed is:

1. A 7/3 counter for generating a three bit output including a sum bit (S), a first carry bit ($C_1$), and a second carry bit ($C_2$), such that $C_2C_1S$ represents the difference between the number of positive, active bits and the number of negative, active bits in a seven-bit input including signed input bits $x_6x_5x_4x_3x_2x_1x_0$, the counter including:

EXCLUSIVE-OR means responsive to the seven-bit input for generating the sum bit according to:

$$S = x_0 V x_1 V x_2 V x_3 V x_4 V x_5 V x_6,$$

where "V" denotes the EXCLUSIVE-OR logical operation; and logic means for combining a group of seven signed input bits to produce $C_1$ and $C_2$, the seven signed input bits having a first bit sign pattern which corresponds to a first range of possible sums of the seven bits or a second bit sign pattern which is the inverse of the first bit sign pattern and which corresponds to a second range of possible sums of the seven bits.

2. The 7/3 counter of claim 1, wherein the firs range of possible sums is 0 through 7, the second range of possible sums is $-7$ through 0, and wherein said logic means generate $c_1$ and $c_2$ in accordance with the logical relationships:

$$c_1 = 4^+{}_{(0:6)}'2^+{}_{(0:6)} + 6^+{}_{(0:6)};$$

$$c_2 = 4^+{}_{(0:6)}; \text{ and}$$

wherein the expression $\Gamma^+(\alpha:\beta)$ means that at least $\Gamma$ of said seven bits are active over a range $\alpha$ through $\beta$ of said seven bits and an apostrophe denotes logical inversion.

3. The 7/3 counter of claim 2 wherein said logic means include a plurality of substage means for generating a plurality of logical constructs, said substrate means including four first substages, two second substates, one third substage and one fourth substage:

said first substages receiving said seven bits and generating the constructs 2(0:1), 1+(0:1);2(2:23), 1+(2:3); 2(4:5), 1+(4:5); and x6, x6';

said second substages receiving said first substage constructs and generating the constructs 4(0:3), 3+(0:3), 2+(0:3), 1+(0:3); and 3(4:6), 2+(4:6), 1+(4:6);

said third substage receiving said second substage constructs and generating the constructs 6+(0:6), 4+(0:6)', 2+(0:6) and 4+(0:6)=$c_2$;

said fourth substage receiving said third substage constructs and generating the value $c_1$; and wherein the expression $\Gamma^+(\alpha:\beta)$ means that at least $\Gamma$ of said seven bits are "on" over a range $\alpha$ through $\beta$ of said seven bits, the expression $\Gamma(\alpha:\beta)$ means that exactly $\Gamma$ of said seven bits are "on" over a range $\alpha-\beta$ of said seven bits and $x_i'$ means the with bit $x_i$ is inverted.

4. The 7/3 counter of claim 1 wherein the first range of possible sums is $-1$ through 6, the second range of possible sums is 1 through $-6$ and wherein said logic means calculate $c_1$ and $c_2$ in accordance with the logical relationships;

$$c_1 = 1^+{}_{(0:5)}3^+{}_{(0:5)}\bar{x}_6 + 5^+{}_{(0:5)}\bar{x}_6 + 2^+{}_{(0:5)}4^+{}_{(0:5)}'x_6 + 6^+{}_{(0:5)}x_6;$$

$$c_2 = \bar{x}_63^+{}_{(0:5)} + x_64^+{}_{(0:5)}; \text{ and}$$

wherein $\Gamma^+(\alpha:\beta)$ means that at least $\Gamma$ of said seven bits are "on" over a range $\alpha$ through $\beta$ of said seven bits, $\Gamma^+(\alpha:\beta)'$ means that at least $\Gamma$ of said seven bits are "off" over a range $\alpha$ through $\beta$ of said seven bits, $\Gamma(\alpha:\beta)$ means that exactly $\Gamma$ of said seven bits are "on" over a range $\alpha$ through $\beta$ of said seven bits, and $x_i$ means the bit $x_i$ is "off".

5. The 7/3 counter of claim 4 wherein said logic means include a plurality of substage means for generating a plurality of logical constructs, said substage means including three first substages, one second substage and one third substage:

said first substages receiving said seven bits and generating the constructs 3(0:2), 2+(0:2), 1+(0:2); 3(3:5), 2+(3:5), 1+(3:5); and x6, $\bar{x}_6$;

said second substage receiving said first stage constructs, except the constructs x6 and $\bar{x}_6$, and generating the constructs 6(0:5), 5+(0:5), 4+(0:5), 3+(0:5), 2+(0:5), 1+(0:5);

said third substage receiving said second stage constructs and the constructs x6, $\bar{x}_6$, and generating $c_1$ and $c_2$; and wherein $\Gamma^+(\alpha:\beta)$ means that at least $\Gamma$ of said seven bits are "on" over a range $\alpha$ through $\beta$ of said seven bits, the expression $\Gamma(\alpha:\beta)$ means that exactly $\Gamma$ of said seven bits are "on" over a range $\alpha-\beta$ of said seven bits and $\bar{x}_i$ means the input $x_i$ is inverted.

6. The 7/3 counter of claim 1 wherein the first range of possible sums is $-2$ through 5, the second range of possible sums is 2 through $-5$, and wherein said logic means calculate $c_1$ and $c_2$ in accordance with the following logical relationships:

$$c_1 = 2^+{}_{(0:4)}'2(5:6) + 0_{(0:4)}1^+(5:6) + 2^+{}_{(0:4)}4^+{}_{(0:4)} \cdot 0(5:6) + 3^+{}_{(0:4)}5_{(0:4)}'1(5:6) + 4^+{}_{(0:4)}2(5:6);$$

$$c_2 = 2^+{}_{(0:4)}0(5:6) + 3^+{}_{(0:4)}1(5:6) + 4^+{}_{(0:4)}; \text{ and}$$

wherein $\Gamma^+(\alpha:\beta)$ means that at least $\Gamma 0$ of said seven bits are "on" over a range $\alpha$ through $\beta$ of said seven bits, $\Gamma^+(\alpha:\beta)'$ means that at least $\Gamma$ of said seven bits are "off" over a range $\alpha$ through $\beta$ of said seven bits, $\Gamma(\alpha:\beta)$ means that exactly $\Gamma$ of said seven bits are "on" over a range $\alpha$ through $\beta$ of said seven bits.

7. The 7/3 counter of claim 6 wherein said logic means include a plurality of substage means for generating a plurality of logical constructs, said substage means including three first substages, one second substage and one third substage:

said first substages receiving said input digits and generating the constructs 3(0:2), 2+(0:2), 1+(0:2), 0(0:2); 2(3:4), 1+(3:4), 0(3:4); and 2(5:6), 1+(5:6), 1(5,6), 0(5:6);

said second substage receiving said first stage constructs, except the constructs 2(5:6), 1+(5:6), 1(5:6) and 0(5:6), and generating the constructs 5(0:4), 4+(0:4), 3+(0:4), 2+(0:4), 1+(0:4) and 0(0:4);

said third substage receiving said second stage constructs and said first stage constructs 2(5:6), 1+(5:6), 1(5:6) and 0(5:6), and generating $c_1$ and $c_2$; and wherein the expression $\Gamma^+(\alpha:\beta)$ means that at least $\Gamma$ of said seven bits are "on" over a range $\alpha$ through $\beta$ of said seven bits and $\Gamma(\alpha:\beta)$ means that exactly $\Gamma$ of said seven bits are 8. The 7/3 counter of claim 1 wherein the first range of possible sums is $-3$ through 4, the second range of possible sums is 3 through $-4$, and wherein said logic means generate $c_1$ and $c_2$ in accordance with the following logical relationships:

$$c_1 = 0_{(0:3)}2^+_{(4:6)} + 2^+_{(0:3)}{}'3_{(4:6)} + 1^+_{(0:3)}3^+_{(0:3)}0_{(4:6)} + 2^+_{(0:3)}4_{(0:3)}{}'1_{(4:6)} + 3^+_{(0:3)}2^+_{(4:6)}3_{(4:6)}{}' + 4_{(0:3)}2^+_{(4:6)}$$

$$c_2 = 1^+_{(0:3)}1^+_{(4:6)}{}' + 2^+_{(0:3)}2^+_{(4:6)}{}' + 3^+_{(0:3)}3_{(4:6)}{}' + 4_{(0:3)}; \text{ and}$$

wherein $\Gamma^+(\alpha:\beta)$ means that at least $\Gamma$ of said seven bits are "on" over a range $\alpha$ through $\beta$ of said seven bits, $\Gamma^+(\alpha:\beta)'$ means that at least $\Gamma$ of said seven bits are "off" over a range $\alpha$ through $\beta$ of said seven bits, $\Gamma(\alpha:\beta)$ means that exactly $\Gamma$ of said seven bits are "on" over a range $\alpha$ through $\beta$ of said seven bits; $\Gamma(\alpha:\beta)'$ means that exactly $\Gamma$ of said seven bits are "off" over a range $\alpha$-$\beta$ of said seven bits.

9. The 7/3 counter of claim 8 wherein said logic means include a plurality of substage means for generating a plurality of logical constructs, said substage means including three first substages, one second substage and one third substage:

said first substages receiving said seven bits and generating the constructs $2(0:1)$, $1^+(0:1)$, $0(0:1)$; $2(2:3)$, $1^+(2:3)$, $0(2:3)$; and $3(4:6)$, $2^+(4:6)$, $1^+(4:6)$;

said second substage receiving said first stage constructs except $3(4:6)$, $2^+(4:6)$ and $1^+(4:6)$, and generating the constructs $4(0:3)$, $2^+(0:3)$, $1^+(0:3)$;

said third substage receiving said second substage constructs and said first substage constructs $3(4:6)$, $2^+(4:6)$ and $1^+(4:6)$, and generating $c_1$ and $c_2$; and wherein the expression $\Gamma^+(\alpha:\beta)$ means that at least $\Gamma$ of said seven bits are "on" over a range $\alpha$ through $\beta$ of said seven bits and $\Gamma(\alpha:\beta)$ means that exactly $\Gamma$ said seven bits are "on" over a range $\alpha$-$\beta$ of said seven bits.

* * * * *

UNITED STATES PATENT AND TRADEMARK OFFICE
CERTIFICATE OF CORRECTION

PATENT NO. : 5,187,679

DATED : February 16, 1993

INVENTOR(S) : Vassiliadis et al

It is certified that error appears in the above-identified patent and that said Letters Patent is hereby corrected as shown below:

Column 13, line 33, please change "firs" to --first--.
Column 13, line 51, please change "2(2:23)" to --2(2:3)--.
Column 14, line 13, please change "$x_i$ means" to --$\bar{x}_i$ means--.
Column 14, line 41, please enter an apostrophe at the end of the line.
Column 14, line 42, please delete the apostrophe at the beginning of the line.
Column 14, line 45, please change the equation to
--$c_2 = 2^+(0:4)^0(5:6) + 3^+(0:4)^1(5:6) + 4^+(0:4)$; and--

Signed and Sealed this

Thirtieth Day of November, 1993

Attest:

BRUCE LEHMAN

Attesting Officer

Commissioner of Patents and Trademarks